(12) United States Patent
Chang et al.

(10) Patent No.: US 12,019,477 B2
(45) Date of Patent: Jun. 25, 2024

(54) DISPLAY FILM ASSEMBLY FOR ELECTRONIC DEVICES

(71) Applicant: Apple Inc., Cupertino, CA (US)

(72) Inventors: Yu-Po Chang, Shanghai (CN); Chun Chih Cheng, San Jose, CA (US); Mandy Wong, San Francisco, CA (US); Marianna C. Sbordone, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/817,490

(22) Filed: Aug. 4, 2022

(65) Prior Publication Data

US 2023/0244270 A1 Aug. 3, 2023

Related U.S. Application Data

(60) Provisional application No. 63/267,283, filed on Jan. 28, 2022.

(51) Int. Cl.
*G06F 1/16* (2006.01)

(52) U.S. Cl.
CPC .......... *G06F 1/1637* (2013.01); *G06F 1/1616* (2013.01); *G06F 1/1681* (2013.01)

(58) Field of Classification Search
CPC .... G06F 1/1637; G06F 1/1616; G06F 1/1681; H04N 1/00129; H04N 23/51
See application file for complete search history.

(56) References Cited

U.S. PATENT DOCUMENTS

| 2013/0058020 A1* | 3/2013 | Jo | G02F 1/1345 361/679.01 |
|---|---|---|---|
| 2023/0232163 A1* | 7/2023 | Kim | H04R 17/00 381/333 |
| 2023/0252817 A1* | 8/2023 | Rosen | G02F 1/133504 349/12 |

* cited by examiner

*Primary Examiner* — James Wu
*Assistant Examiner* — Dakota M Talbert
(74) *Attorney, Agent, or Firm* — Dorsey & Whitney LLP

(57) ABSTRACT

In at least one example, an electronic device can include a display film and a retention assembly for the display film. The retention assembly can include an aperture defined by the display film with the display film encircling the aperture. The retention assembly can further include a post extending towards the aperture and a bracket having a first portion adhered to the display film and a second portion abutting the post.

20 Claims, 10 Drawing Sheets

DISPLAY FILM ASSEMBLY FOR ELECTRONIC DEVICES

CROSS-REFERENCE TO RELATED APPLICATION

This application claims the benefit of U.S. Provisional Patent Application No. 63/267,283, filed 28 Jan. 2022, entitled "ELECTRONIC DEVICE," the entire disclosure of which is hereby incorporated by reference.

FIELD

The described embodiments relate generally to electronic devices. More particularly, the present embodiments relate to electronic computing devices.

BACKGROUND

Electronic devices are increasingly being designed with device portability in mind, for example, to allow users to use these devices in a wide variety of situations and environments. Portable electronic devices are often compact devices with small form-factors to increase portability. These portable devices can be designed to include many different functionalities and to be operated in many different locations and environments. The components of a portable electronic device, for example the processors, memory, antennas, displays, and other components can partially determine a level of performance of the electronic device. Further, the arrangement of these components with respect to one another in the device can also determine the level of performance of the electronic device.

Continued advances in electronic devices and their components have enabled considerable increases in performance. Existing components and structures for portable electronic devices can, however, limit the levels of performance of such devices. For example, the placement and orientation of audio components, including speakers and microphones, as well as audio ports and apertures, can affect the audio input and output performance of the device. Also, for example, the arrangement and configuration of the various components of a display assembly of a device, including display films and other display layers of portable electronic devices, can affect the performance of the device.

SUMMARY

In one embodiment, a display film retention assembly can include an aperture defined by a display film, a post extending toward the aperture, and a bracket having a first portion adhered to the display film and a second portion abutting the post.

In at least one example, the second portion is disposed at an angle relative to the first portion. In at least one example, the second portion extends through the aperture. In at least one example, the post extends through the aperture. In at least one example, the first portion is adhered to the display film with a pressure sensitive adhesive. In at least one example, the post extends from a housing component and the display film is disposed between the first portion of the bracket and the housing component. In at least one example, the second portion of the bracket extends through the aperture and terminates between the display film and the housing component. In at least one example, the first portion of the bracket is disposed between the housing component and the display film.

In at least one example of the present disclosure, an electronic device can include a housing defining an internal volume, a film layer disposed in the internal volume, a post extending from the housing and through the aperture, and a bracket. The film layer can define an aperture and the first portion of the bracket can be adhered to the display film and a second portion can be disposed at an angle relative to the first portion. The second portion of the bracket can extend through the aperture.

In at least one example, the film layer can be disposed between the first portion of the bracket and the housing. In at least one example, the second portion of the bracket can be disposed between the film layer and the housing. In at least one example, the bracket abuts the post. In at least one example, the angle can be between about 80-degrees and about 90-degrees. In at least one example, the angle can be about 90-degrees. In at least one example, a foam biasing member can be disposed against the first portion of the bracket.

In at least one example, an electronic device can include a display component, a rear housing, a display film disposed between the display component and the rear housing, the film defining an aperture, a post extending from the rear housing toward the aperture, and a bracket including a first portion adhered to the display film and a second portion abutting the post.

In at least one example, the post is aligned with the aperture. In at least one example, the post extends through the aperture. In at least one example, the second portion of the bracket extends through the aperture. In at least one example, the device can further include a biasing member disposed between the first portion and the display component.

In at least one example of the present disclosure, an electronic device can include a lower portion including a housing. The housing can define an internal volume and a rear side defining an aperture. The device can further include an upper portion rotatably connected to the lower portion at the rear side, an aperture defined by the rear side, an audio component disposed in the internal volume, and a channel defined by the housing extending from the audio component to the aperture.

In at least one example, the housing can include a top housing portion defining an upper surface, the rear side can include a wall extending downward from the top housing portion, and the wall can define the aperture. In at least one example, the wall can define the channel. In at least one example, the top housing portion defines the channel. In at least one example, the device can include an open configuration including the upper portion rotated away from the lower portion. In such an example, the channel can extend to the aperture toward the upper portion in the open configuration. In at least one example, the upper portion can include a display screen. In at least one example, the lower portion can include a keyboard.

In at least one example of the present disclosure, an electronic device can include a lower portion including a housing defining an internal volume and a rear side having a rear sidewall, an upper portion connected to the rear side, an aperture defined by the rear sidewall, and an audio component disposed in the internal volume, the audio component in fluid communication with an outside environment through the aperture.

In at least one example, the device can further include a channel extending from the audio component to the aperture. In at least one example, the audio component can include a speaker. In at least one example, the channel directs sound from the speaker toward the upper portion. In at least one example, the audio component can include a microphone. In at least one example, the channel can be defined by the housing. In at least one example, the upper portion can be rotatably connected to the lower portion.

In at least one example of the present disclosure, an electronic device can include a base having a housing defining an internal volume. The housing can include an upper portion and a rear side having a rear sidewall extending downward from the upper portion. The device can further include a display component rotatably connected at the rear side, a first aperture defined by the rear sidewall, a second aperture defined by the rear sidewall, a speaker disposed in the internal volume and in fluid communication with an external environment through the first aperture via a first channel defined by the housing, and a microphone disposed in the internal volume and in fluid communication with the external environment through the second aperture via a second channel defined by the housing.

In at least one example, the device can further include an open configuration with the display component rotated away from the base such that a display screen of the display component is disposed at an angle relative to the base. In at least one example, the first channel directs sound from the speaker toward the display screen in the open configuration. In at least one example, the first channel and the second channel are defined by the upper portion of the housing. In at least one example, the first channel can be defined by the housing of the display component in the open configuration.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
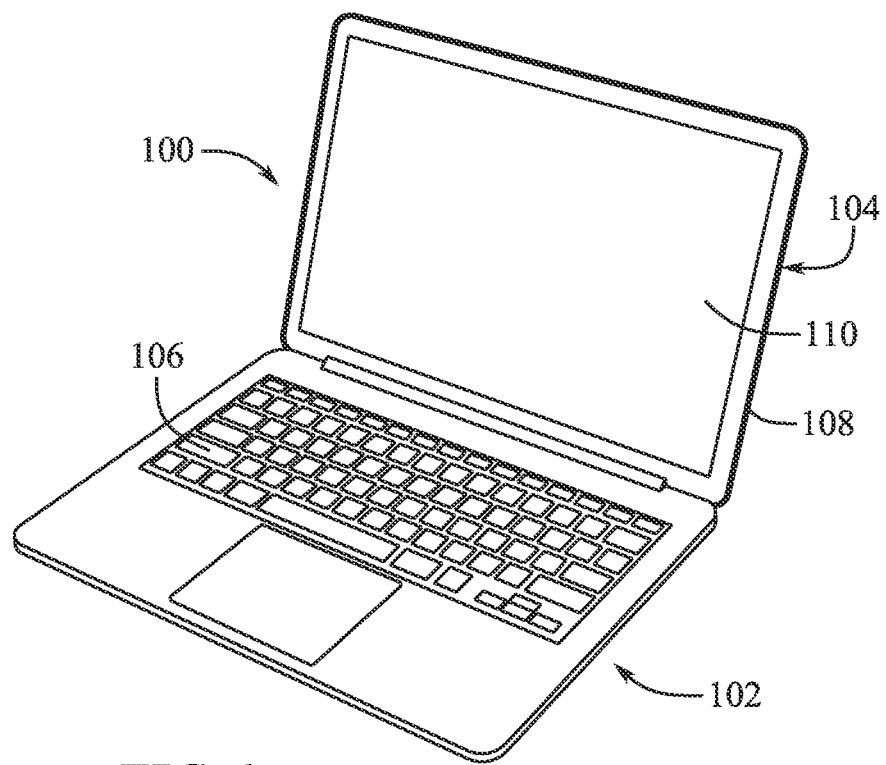
FIG. 1 shows a perspective view of an example of a portable electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The arrangement and configuration of the various components of a display assembly of a portable electronic device, including display films and other display layers, can affect the quality and performance of the display output. Display assemblies can include multiple layers, including an outer transparent layer, a display component disposed beneath the transparent layer, and one or more other display films stacked next to the display component, with the display component disposed between the transparent component and the display film(s). The display films can be disposed inside the internal volume defined by a housing of the device and secured generally parallel to the display component.

In order to ensure proper functioning of the display assembly, the display films should be kept fixed in position. This can be problematic, however, for display assemblies of portable electronic devices, which are meant to be moved around during use and which may encounter bumps, falls, jostling, or other movements during use. Thus, in order to securely dispose the display films in place within a portable electronic device, one or more devices described herein can include a display film retention assembly.

In at least one example of the present disclosure, a display film retention assembly can include an aperture defined by the display film, a post extending toward the aperture, and a bracket having a first portion adhered to the display film and a second portion abutting the post. In one example, the post can extend from a rear housing of the display component of the device defining an internal volume thereof. The post can extend through the aperture to maintain the display film in position. In addition, in at least one example, the second portion of the bracket which abuts the post, can extend into the aperture such that the bracket maintains the display film in position and prevents the display film from rising over the post (so that the post no longer extends through the aperture) and being moved out of position.

Additionally, portable electronic devices of the present disclosure can include a user input surface or mechanism, such as a keyboard, touchpad, various buttons, and the like. For example, a phone or tablet computer can include touchscreens and touchpads, power and volume buttons, and other input mechanisms. In the case of a laptop computer, a display portion having a display component or display screen can be rotatably connected to a base portion that includes an upper surface having an input component. The input component can include a keyboard, touchpad, power button, or other user input mechanisms.

In addition to user input mechanisms, one or more audio components can be configured to output or receive audio content in or through the base portion. Audio component can include one or more microphones and/or one or more speakers. The audio components can be disposed in the based portion of the laptop computer (or other portable electronic device) with meshes, ports, and aperture providing fluid communication between the audio component and the external environment. The top surface of the base portion of a laptop computer, for example, is often used for such meshes and apertures because the top surface of the base portion is generally directed toward the user during use.

However, with the increasing miniaturization and compactness of portable electronic devices, it can be desirable to maximize the available space on the device for the user input mechanisms, which need to be large enough for user's to effectively and comfortably interact with the device. Accordingly, portable electronic device of the present disclosure include audio ports, apertures, and openings located on surfaces and sides of the device other than the top surface of the base portion. In addition, because other surfaces may or may not be oriented toward the user during use, the orientation and configuration of such audio ports and apertures on other surfaces and sides can be configured so as not to diminish the audio performance of the device.

In at least one example, an electronic device can include a lower base portion including a housing. The housing can define an internal volume of the lower portion and a rear side defining an aperture. The device can also include an upper portion rotatably connected to the lower portion at the rear side, an audio component disposed in the internal volume, and a channel extending from the audio component to the aperture.

For example, an audio port for a microphone or speaker can be disposed on a rear surface of the base portion of a portable device. One or more channels, which can be formed in or by the base portion, can extend from the audio component in the base portion toward a display portion of the device. In this way, the audio being received or output by the audio component can reflect off the display portion of the device toward the user. Thus, the rearward location of the audio ports does not diminish the quality or amount of sound being directed toward the user. Rather, the rear facing audio ports can maintain high quality audio performance of the device while maximizing the available space on the top surface of the base portion for user input mechanisms. In addition, the rear facing audio ports described herein are generally hidden from view during normal use of the portable electronic devices described herein such that the devices present a simpler, more appealing aesthetic design.

These and other embodiments are discussed below with reference to FIGS. 1-14, with FIGS. 1-6 detailing the display film retention assembly, and FIGS. 7-14 detailing the porting systems. However, those skilled in the art will readily appreciate that the detailed description given herein with respect to these Figures is for explanatory purposes only and should not be construed as limiting.

FIG. 1 shows an example of a portable electronic device 100, such as a laptop computer, including a base 102 and a display component 104. The display component 104 can include a housing 108 and a display 110 configured to output a visual display to the user. The base 102 can include an input surface or mechanism, including the keyboard 106 shown in FIG. 1. In at least one example, the display component 104 can be rotatably connected to the base 102 such that a display 110 can be rotated toward the keyboard 106 and away from the keyboard 106 to close and open the device 100, respectively, during use.

The illustrated portable device 100 is one example of a portable electronic device. However, the devices and components described herein, including display assemblies and display film retention assemblies and components of portable electronic devices, are not limited to the example shown in FIG. 1. Other examples of portable electronic devices can include tablet computers, phones, electronic watches, or any other portable electronic device including a display assembly.

Any of the features, components, and/or parts, including the arrangements and configurations thereof shown in FIG. 1 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 1.

Figure 2:
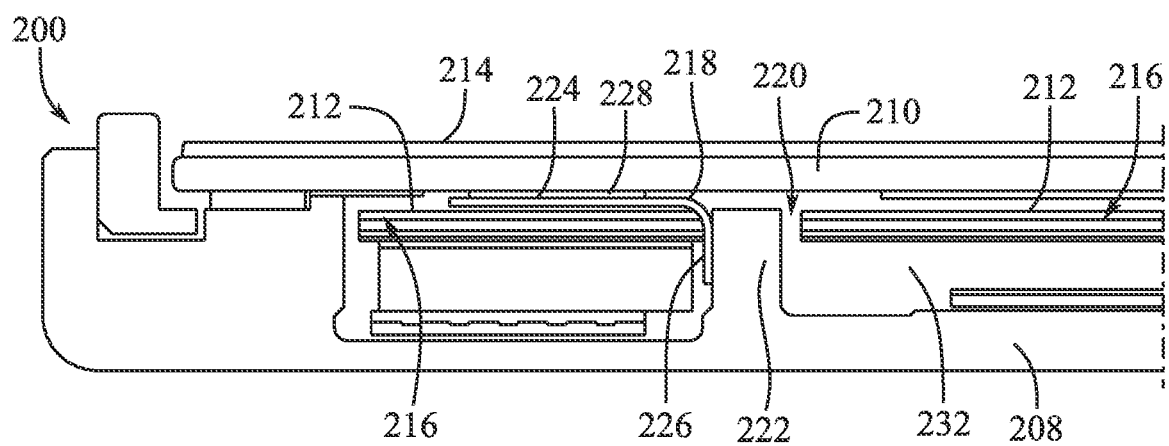
FIG. 2 shows a cross-sectional view of a portion of a display component of an example of a portable electronic device.

FIG. 2 shows a cross-sectional view of a section of a display portion of an exemplary portable electronic device 200. The display portion can include a housing 208 and a display component 210 disposed below/next to a transparent cover 214. The housing 208 can define an interior volume 232 in which one or more display films 216 can be disposed. In at least one example, the display component 210 can be disposed between the display films 216 and the transparent cover 214. The display films 216 can include one or more films, including display film 212 disposed parallel and/or adjacent to the display component 210.

In at least one example, as shown in FIG. 2, a display film retention assembly 200 can include an aperture 220 defined by the display film 212, a post 222 extending toward the aperture 220, a bracket 218 having a first portion 224 adhered to the display film 212 and a second portion 226 abutting the post 222. In at least one example the post 222 can extend from the housing 208.

In at least one example, the second portion 226 of the bracket 218 can be disposed at an angle relative to the first portion 224. This angle can vary in one or more examples. The second portion 226 can be angled so as to extend through the aperture 220 as shown in FIG. 2. In addition, in at least one example, the post 222 can extend through the aperture 220. The first portion 224 of the bracket 218 can be adhered to the display film 212, for example with a pressure sensitive adhesive. One or more other adhesives, glues, or other securing systems can be used to adhere the first portion 224 of the bracket 218 to the display film 212 in one or more other examples.

In addition, in at least one example, a biasing member 228 can be disposed between the first portion 224 and the display component 210. The biasing member 228 can maintain a consistent space between the display film 212 and the bracket 218. In at least one example, the biasing member 228 can include an elastic material sandwiched between the first portion 224 of the bracket 218 and the display component 210, which urges the bracket 218 away from the display component 210. In at least one example, the biasing member 228 can include a foam material. In at least one example, the biasing member 228 can include an elastic polymer material. In at least one example, the biasing member 228 can include a spring mechanism.

In addition, in at least one example, a biasing member 228 can be disposed between the first portion 224 and the display component 210. The biasing member 228 can maintain a consistent space between the display film 212 and the bracket 218. In at least one example, the biasing member can include an elastic material sandwiched between the first portion 224 of the bracket 218 and the display component 210, which urges the bracket 218 away from the display component 210. In at least one example, the biasing member 218 can include a foam material. In at least one example, the biasing member can include an elastic polymer material. In at least one example, the biasing member 218 can include a spring mechanism.

In addition, in at least one example, the post 222 can extend from the housing 208. In one example, the display film 212 can be disposed between the first portion 224 of the bracket 218 and the housing 208. In such an example, the second portion 226 of the bracket 218 can extend through the aperture 220 and terminate between the display film 212 and the housing 208 such that a portion of the bracket 218 is disposed between the post 222 and the display film 212 at the aperture 220. In such an example, the first portion 224 of the bracket 218 can be disposed between the housing 208 and the display film 212.

Any of the features, components, and/or parts, including the arrangements and configurations thereof shown in FIG. 2 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 2.

Figure 3:
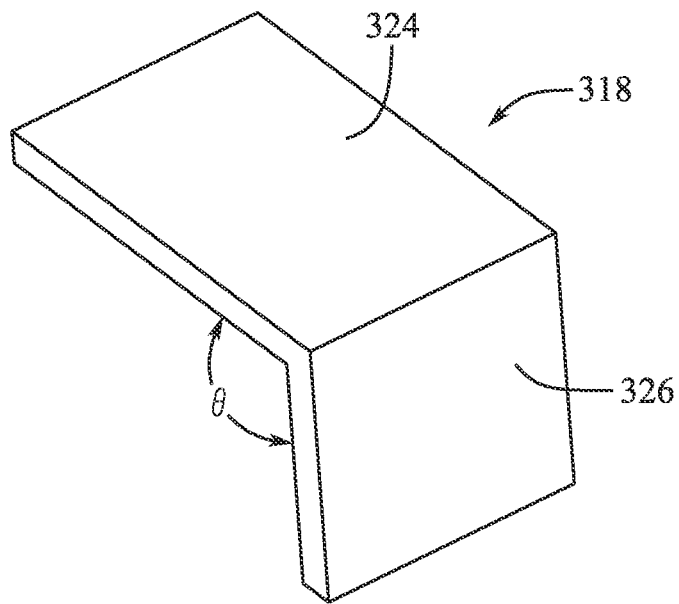
FIG. 3 shows a perspective view of a retention bracket.

FIG. 3 shows an example of a film retention bracket 318, including a first portion 324 and a second portion 326 disposed at an angle Θ relative to the first portion 224. The angle Θ can vary in one or more examples. For example, the angle Θ can be about 90-degrees, as shown in FIGS. 2 and 3. In one or more other examples, the angle Θ can be between about 70-degrees and 110-degrees, or between about 80-degrees and 100-degrees, or between about 85-degrees and 95-degrees. In any case, the angle Θ is sufficient to form a bend in the bracket 318 such that the second portion 326 can extend into the aperture 220 defined by the display film 212 when the first portion 324 is adhered to the display film 212.

That is, when the bracket 318 is adhered to the display film 212 as shown in FIG. 2, the first portion 324 can be disposed generally parallel to the display film 212 and the other display components, including the display component 210 and the transparent cover 214 shown in FIG. 2. In such an example, with the first portion 324 of the bracket 318 disposed parallel to the display film 212, the angle Θ is sufficient to form a bend in the bracket 318 such that the second portion 326 extends through the aperture 220 defined by the display film 212, as shown in FIG. 2.

As shown in FIG. 3, the exemplary bracket 318 includes the first portion 324 and the second portion 326 having a rectangular shape. However, one or more other examples of brackets can include first and/or second portions 324, 326 of various other shapes, including non-rectangular shapes. In addition, the size, thickness and material of the bracket 318 can vary in one or more other examples.

Any of the features, components, and/or parts, including the arrangements and configurations thereof shown in FIG. 3 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 3.

Figure 4:
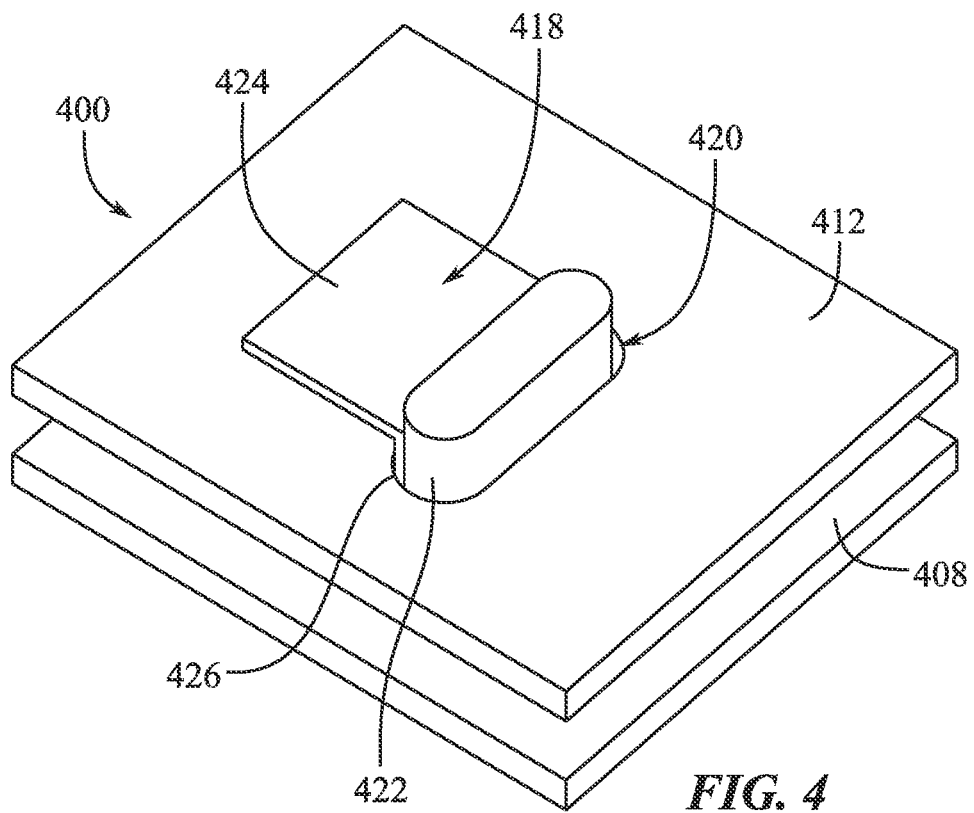
FIG. 4 shows a perspective view of a film retention assembly.

FIG. 4 shows a perspective view of a film retention assembly 400, including a film layer 412 defining an aperture 420. In at least one example, as described above, the display film 412 can be disposed within an internal volume of a portable electronic device. The film retention assembly 400 can also include a post 422 extending from a housing 408 and through the aperture 420. The film retention assembly 400 can also include a bracket 418 including a first portion 424 adhered to the display film 412, and a second portion 426 disposed at an angle Θ relative to the first portion 424. The second portion 426 can extend through the aperture 420.

In at least one example, an electronic device can include a display component (210 in FIG. 2) having a rear housing 408 and a display film 412 disposed between the display component and the rear housing 408, as shown in FIG. 4. In at least one example, the display film 412 can define an aperture 420. A post 422 can extend from the rear housing 408 toward the aperture 420, and the bracket 418 can include the first portion 224 adhered to the display film 412 and the second portion 426 abutting the post 422.

In at least one example, the display film 412 can be disposed between the first portion 424 of the bracket 418 and the housing 408. Accordingly, the second portion 426 of the bracket 418 can be disposed between the display film 412 and the housing 408. In such an example, the second portion 426 of the bracket 418 abuts the post 422. The post 422 can be aligned with the aperture 420 such that the second portion 426 of the bracket 418 abuts the post 422. In one example, the post 422 can extend through the aperture 420 such that the post 422 extends from one side of the display film 412 to the other opposing side through the aperture 420.

Any of the features, components, and/or parts, including the arrangements and configurations thereof shown in FIG. 4 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 4.

Figure 5:
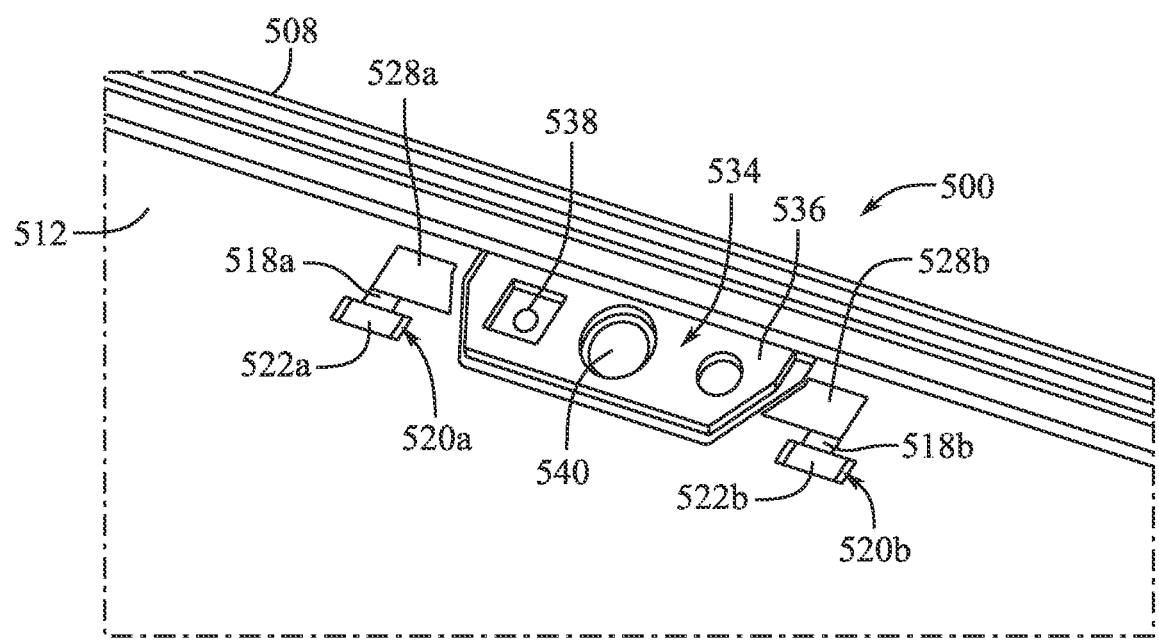
FIG. 5 shows a perspective view of a section of a display portion of an exemplary portable electronic device.

FIG. 5 shows a perspective view of an area of a display portion 500 of a portable electronic device, including a housing 508, a display film 512, and two brackets 518a, 518b. The display portion 500 can include a visual system 534, including camera 540, light 538, and a bracket 536 securing the camera 540 and the light 538. Other examples of visual systems can include one or more other visual components including visual sensors, lights, and other cameras. In the illustrated example of FIG. 5, the display film 512 includes a cutout to accommodate the visual system 534. The display film can also define one or more apertures 520a, 520b disposed on either side of the visual system 534.

In at least one example, the housing can include posts 522a and 522b extending from the housing 508 and aligned with the apertures 520a and 520b, respectively. In at least one example, the posts 522a and 522b extend through the apertures 520a and 520b, respectively. The brackets 518a and 518b are adhered to the film 512 and through the apertures 520a and 520b, respectively, to abut the posts 522a and 522b, respectively. In this way, the display portion 500 of the device can include multiple film retention assemblies to secure the display film 512 in place during use.

FIG. 5 also shows biasing members 528a and 528b disposed over the brackets 518a and 518b, respectively. The display component of the display portion 500 is not shown in FIG. 5 but can be disposed over and against the biasing members 528a and 528b. In at least one example, as noted above and as shown in FIG. 5, the biasing members 528a and 528b can include an elastic material such as a foam or an elastic polymer material such as rubber or silicone to bias the display film 512 away from the display component (not shown).

Any of the features, components, and/or parts, including the arrangements and configurations thereof shown in FIG. 5 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5.

Figure 6:
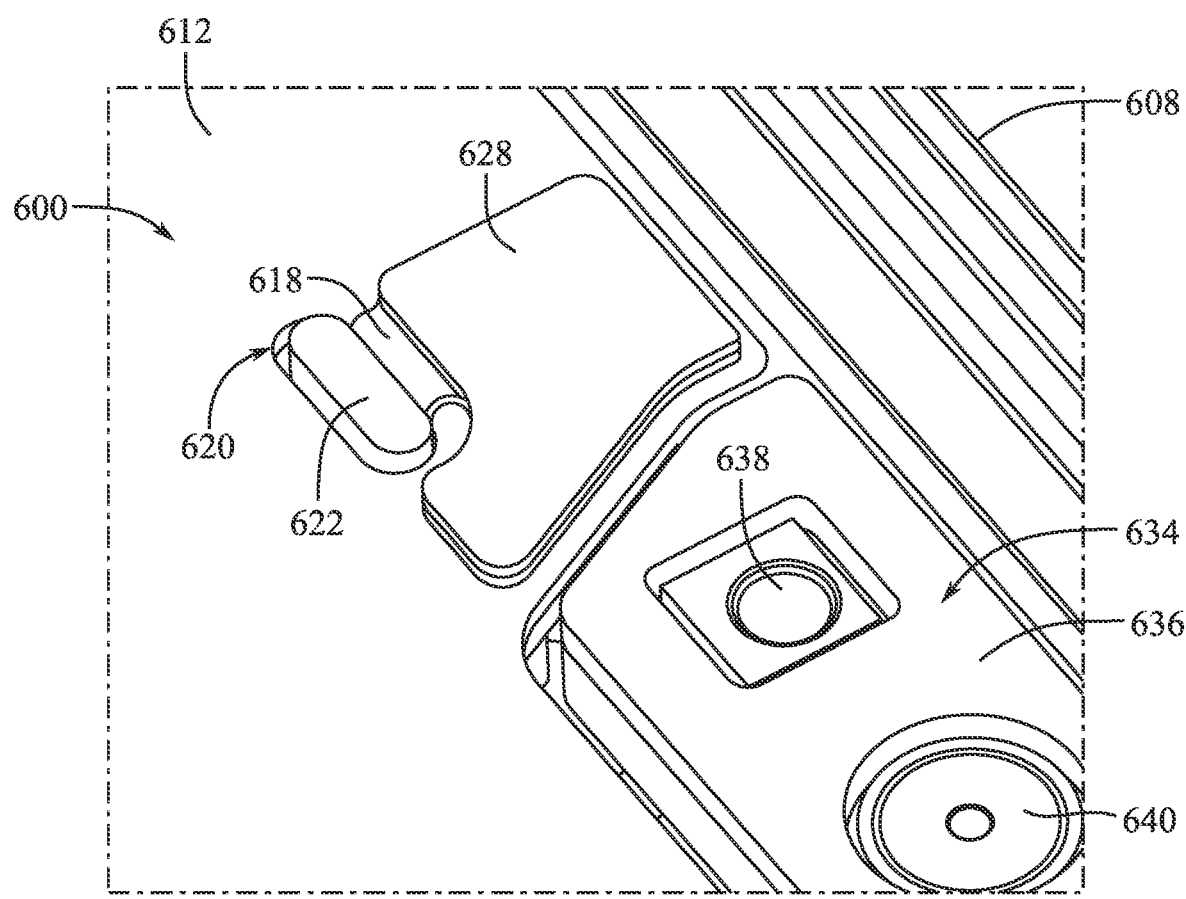
FIG. 6 shows a perspective view of an area of a display portion of an exemplary portable electronic device.

FIG. 6 shows a perspective view of a portion of a display portion 600 of an exemplary portable electronic device, including a housing 608, a display film 612, and a retention bracket 618. The display portion 600 can include a visual system 634, including camera 640, light 638, and a bracket 636 securing the camera 640 and the light 638. Other examples of visual systems can include one or more other visual components including visual sensors, lights, and other cameras. In the illustrated example of FIG. 6, the display film 612 includes a cutout to accommodate the visual system 634. The display film can also define an aperture 620 disposed on either side of the visual system 634.

In at least one example, the housing can include post 622 extending from the housing 608 and aligned with the aperture 620, respectively. In at least one example, the post 622 extends through the aperture 620, respectively. The bracket 618 is adhered to the film 612 and through the aperture 620, respectively, to abut the post 622, respectively. In this way, the display portion 600 of the device can include the film retention assembly to secure the display film 612 in place during use.

FIG. 6 also shows biasing member 628 disposed over the bracket 618, respectively. The display component of the display portion 600 is not shown in FIG. 6 but can be disposed over and against the biasing member 628. In at least one example, as noted above and as shown in FIG. 6, the biasing member 628 can include an elastic material such as a foam or an elastic polymer material such as rubber or silicone to bias the display film 612 away from the display component (not shown).

Any of the features, components, and/or parts, including the arrangements and configurations thereof shown in FIG. 6 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 6.

Turning now to FIGS. 7-14, exemplary systems and configurations for accommodating input mechanisms and audio components are detailed. However, those skilled in the art will readily appreciate that the detailed description given herein with respect to these Figures is for explanatory purposes only and should not be construed as limiting.

Figure 7:
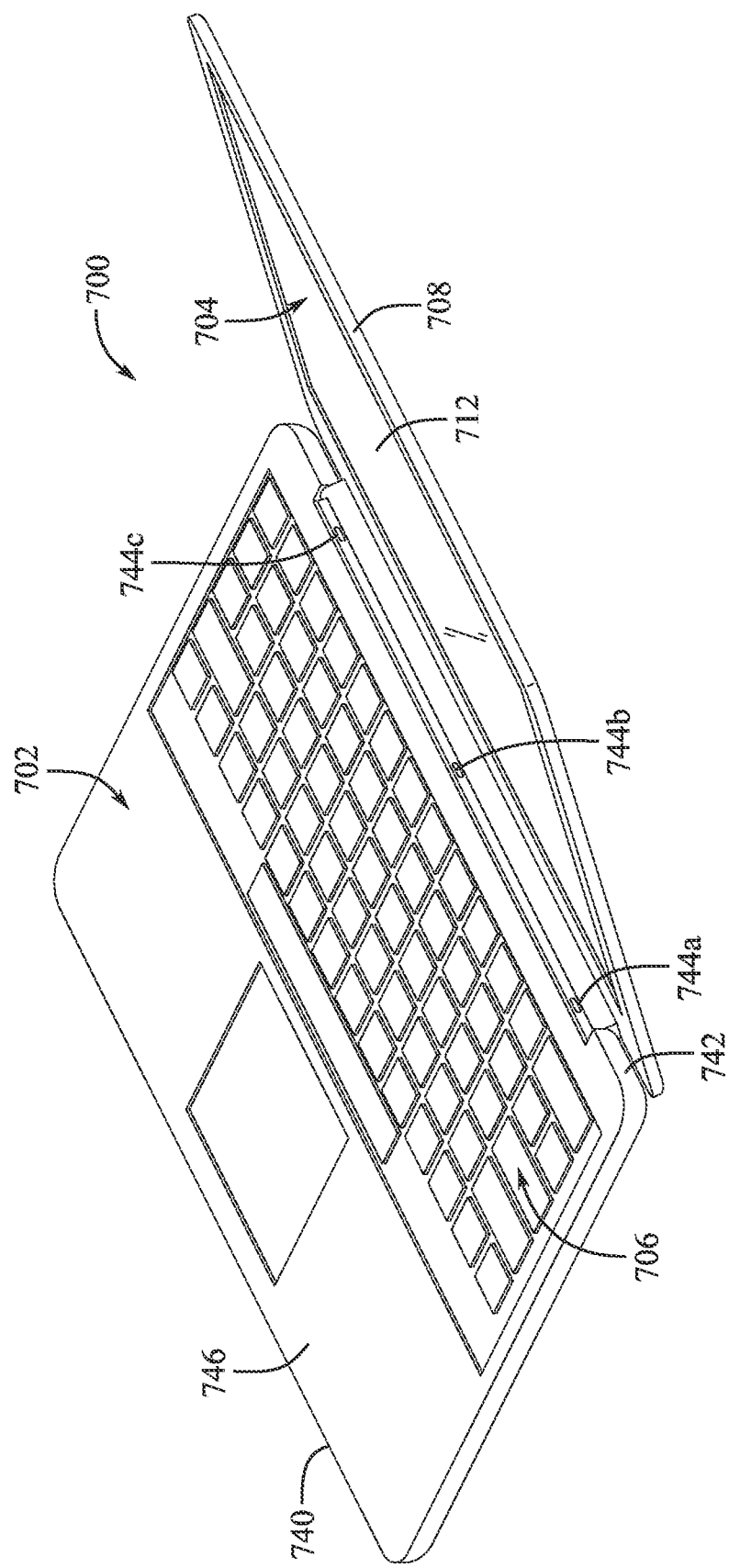
FIG. 7 shows a perspective view of an exemplary portable electronic device.

FIG. 7 shows an example of a portable electronic device 700. In the illustrated example, the device 700 can include a lower base portion 702 including a housing 740. The housing 740 can define an internal volume of the lower portion 702 and a rear side 742 defining one or more apertures 744a, 744b, and 744c. The device 700 can also include an upper display portion 704 rotatably connected to the lower portion 702 at the rear side 742, an audio component disposed in the internal volume (not shown in FIG. 7), and a channel extending from the audio component to the aperture 744a-c. The channel is not illustrated in FIG. 7 but will be described in more detail with reference to FIGS. 8-14. The display portion 704 of the device 700 can include a display portion housing 708 and a display screen 712.

Also shown in FIG. 7 is an input component 706 including a keyboard on the lower portion 702 of the device 700. The housing 740 of the lower portion 702 can define an upper surface 746 of the lower portion 702 and a rear side 742 extending downward from the upper surface 746 of the lower portion 740. As used herein, the term "rear," "rear side," "rearward," "rearward facing," or other related terms denote a side or face of the portable device facing away from the user during use. For example, with respect to the device 700 shown in FIG. 7, during use, the device 700 is generally oriented so that the display screen 712 of the display portion 704 faces the user. In such an orientation, the "rear" side 742 of the device 700 is oriented away from the user.

Any of the features, components, and/or parts, including the arrangements and configurations thereof shown in FIG. 7 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 7.

Figure 8:
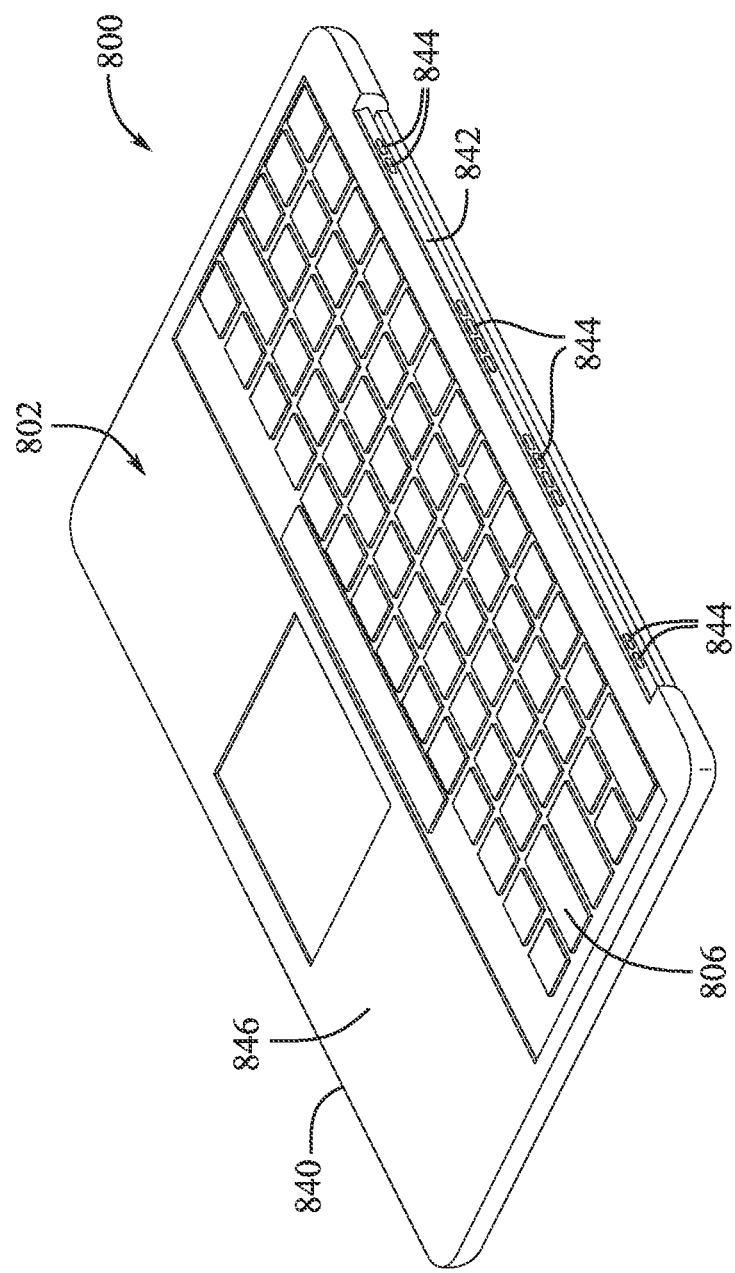
FIG. 8 shows a perspective view of a base portion of an exemplary portable electronic device.

FIG. 8 shows a perspective view of a portion of a portable electronic device, including the lower portion similar to the lower portion 702 shown in the device 700 of FIG. 7. The base portion 802 can include an input mechanism 806 and a housing 840 defining an upper surface 846 and a rear side 842. The device of FIG. 8 is shown without a rotatably connected display portion such that the rear side 842 of the base portion 802 is more visible. In the illustrated example of FIG. 8, the rear side 842 can define a number of apertures 844 disposed along a length of the rear side 842. The number, arrangement, size, shape, and size of the apertures 844 can vary from one example to another in the portable electronic device described herein.

In the example shown in FIG. 7, the device 700 includes three apertures 744a, 744b, and 744c. In the illustrated example of FIG. 8, the device 800 includes twelve apertures 844. The apertures 844 can be grouped together or separate as shown. In addition, in at least one example, the shape of the apertures 844 of a single device can vary depending on the audio design requirements of the device. During use, the apertures 844 disposed on the rear side 842 of the device 800 can direct sound initially away from the user. In examples where a display component is connected to the base portion 802 of the device 800, which faces the user during use, the sound waves output through the apertures 844 can reflect off the display portion and be directed toward the user. Likewise, sound entering the apertures 844 can be directed toward the display portion by the user such that the sound is reflected from the display portion toward/into the apertures 844.

Figure 9:
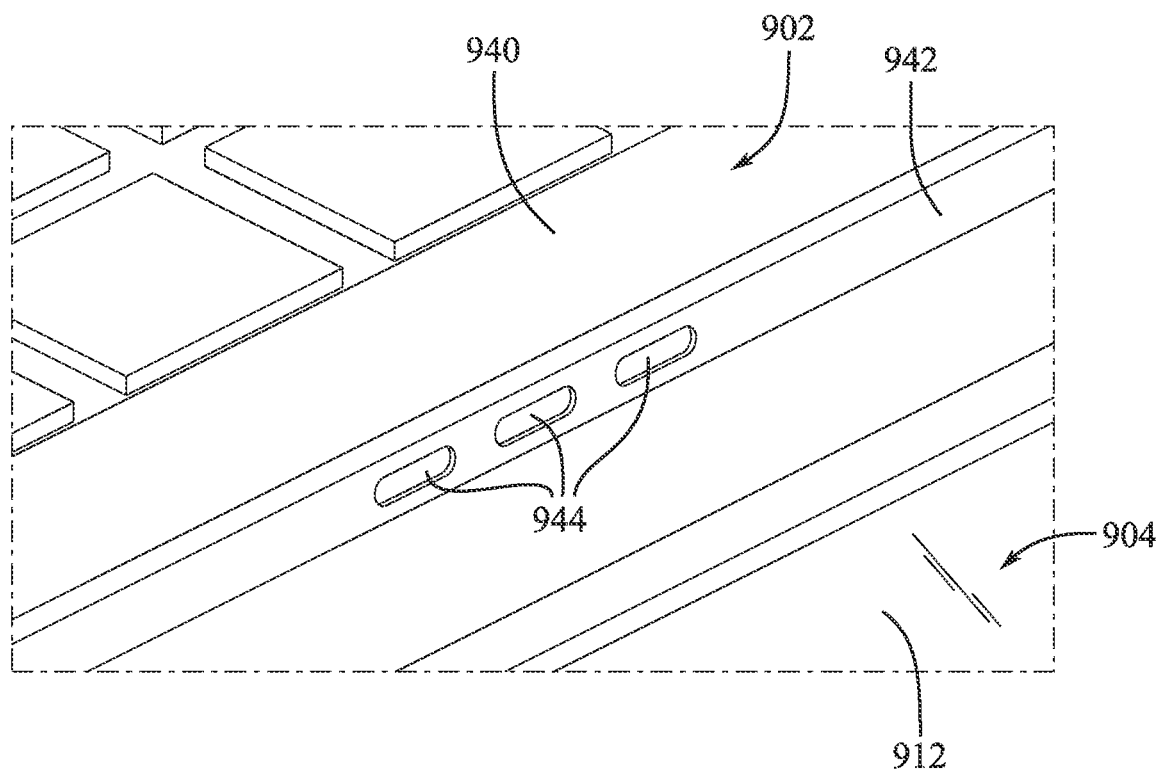
FIG. 9 shows a perspective view of a portion of a base portion of an exemplary portable electronic device.

FIG. 9 shows a close-up view of a device similar to that shown in FIG. 8 but with three apertures 944 defined by the rear side 942 of the base portion 902. The housing 940 can define the rear side 942. As shown, the apertures 944 are configured to direct and receive sound to and from the display portion 904, including the display screen 912, toward the user during use.

Any of the features, components, and/or parts, including the arrangements and configurations thereof shown in FIGS. 8 and 9 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 8 and 9.

Figure 10:
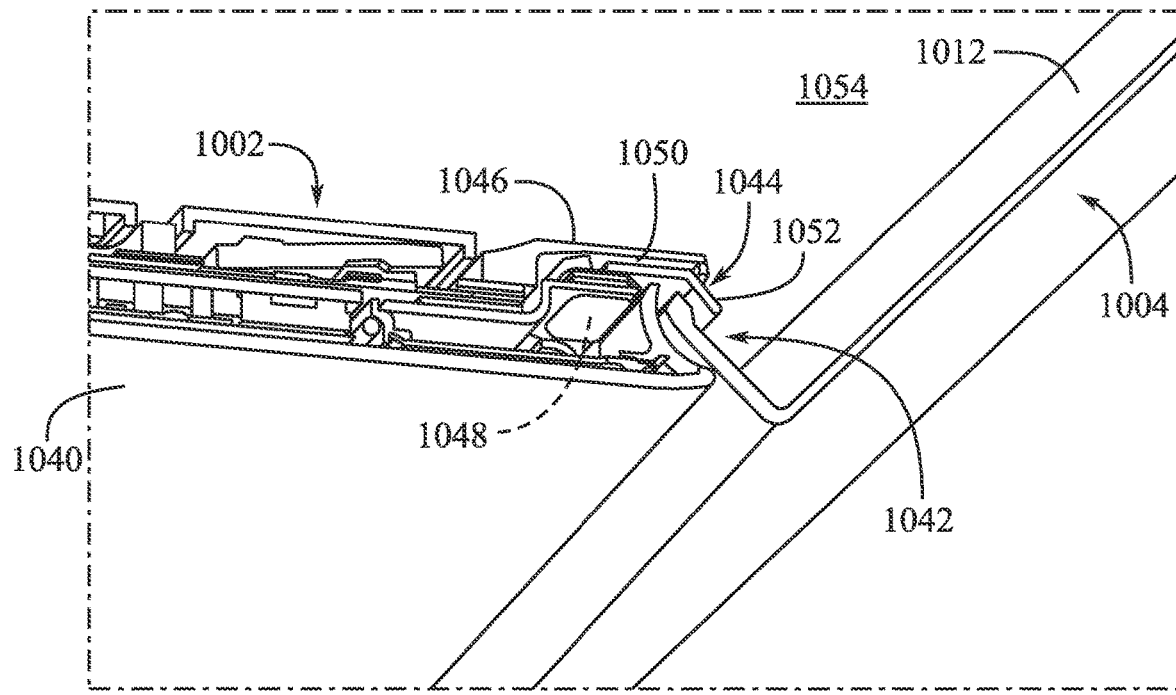
FIG. 10 shows a perspective, cross-sectional view of an exemplary electronic device.

FIG. 10 shows a perspective, cross-sectional view of another example of a device including a lower base portion 1002 having a housing 1040 defining an internal volume, a top housing portion 1046, and a rear side 1042. The rear side 1042 can include a rear wall 1052 extending downward from the top housing portion 1046 of the housing 1040. In addition, the device can include an upper portion 1004, such as an upper display portion having a display screen 1012, connected at the rear side 1042. In at least one example, an aperture 1044 can be define by the rear wall 1052 and an audio component 1048 can be disposed in the internal volume of the device. The audio component 1048 can be in fluid communication with an outside environment 1054 through the aperture 1044. A channel 1050 can extend from the audio component 1048 to the aperture 1044.

Any of the features, components, and/or parts, including the arrangements and configurations thereof shown in FIG. 10 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 10.

Figure 11:
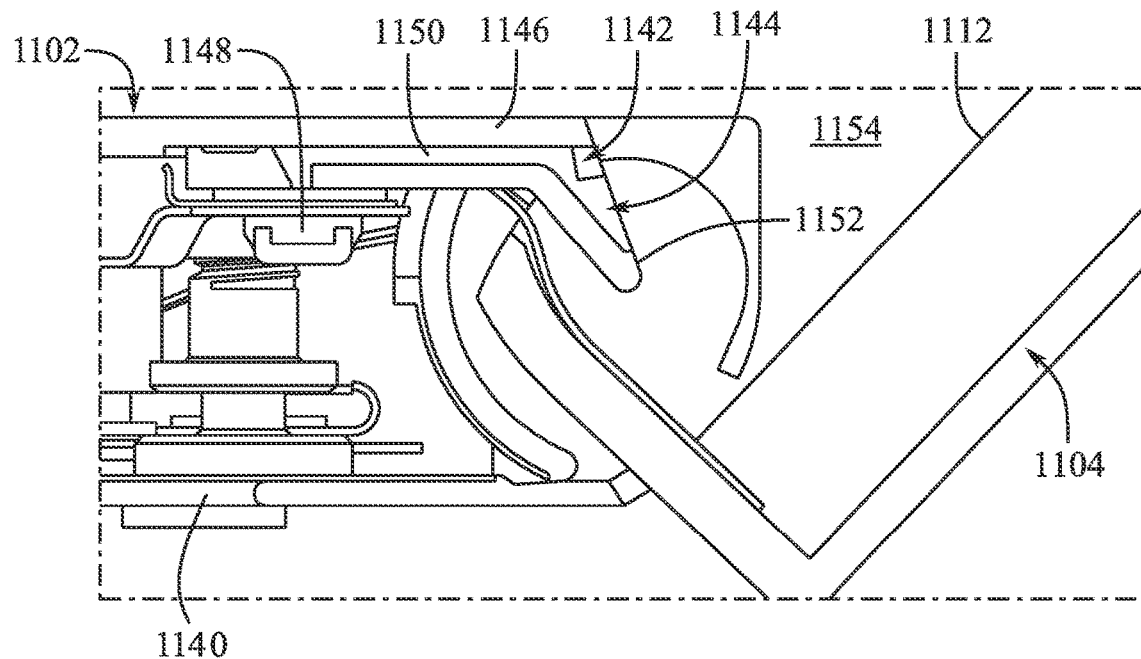
FIG. 11 shows a cross-sectional view of a portion of an exemplary portable electronic device.

FIG. 11 shows a side cross-sectional view of a device similar to the device shown in FIG. 10. The device in FIG. 11 can include a lower base portion 1102 having a housing 1140 defining an internal volume, a top housing portion 1146, and a rear side 1142. The rear side 1142 can include a rear wall 1152 extending downward from the top housing portion 1146 of the housing 1140. In addition, the device can include an upper portion 1104, such as an upper display portion having a display screen 1112, connected at the rear side 1142. In at least one example, an aperture 1144 can be define by the rear wall 1152 and an audio component 1148 can be disposed in the internal volume of the device. The audio component 1148 can be in fluid communication with an outside environment 1154 through the aperture 1144. A channel 1150 can extend from the audio component 1148 to the aperture 1144.

In addition, in at least one example, the aperture 1144 can include a shape having a major axis extending laterally along a major length of the rear side 1142 (oriented into and out of the page of FIG. 11). In this way, as the channel 1150 constricts vertically, as shown in FIG. 11 near the aperture 1144, the cross-sectional area of the channel 1150 through which sound passes from or to the audio component 1148 is still maintained as the channel expands laterally (in and out of the page according to the orientation of FIG. 11). In this way, the channel 1150 is not overly restricted at any point along the channel 1150 to avoid unwanted resonance or other turbulent effects as sound waves travel through the channel 1150.

In at least one example, the rear wall 1152 at least partially defines the channel 1150. Also, as shown in FIG. 11, in at least one example, the top housing portion 1146 at least partially defines the channel 1150. The device in FIG. 11 is shown in an open configuration including the upper portion 1104 rotated away from the lower portion 1102. The upper portion 1104 can be rotatably connected to the lower base portion 1102 such that the user can rotate the upper portion 1104 relative to the top housing portion 1146 to open and close the device. In such an open configuration shown in FIG. 11, the channel 1150 can directed sound from the audio component 1148, for example a speaker, toward the upper portion 1104. In this way, even though the aperture 1144 is rear-facing, the sound directed by the channel 1150 out the aperture 1144 reflects off the upper portion 1104, for example the display screen 1112, and back toward the user during use.

In another example, the audio component 1148 can include a microphone. Accordingly, with the aperture 1144 defined by the rear side 1142, sound from the user or the external environment 1154 can reflect off the upper portion 1104 and into the channel 1150 through the aperture 1144 from the aperture 1144 to the microphone 1148.

Any of the features, components, and/or parts, including the arrangements and configurations thereof shown in FIG. 11 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 11.

Figure 12:
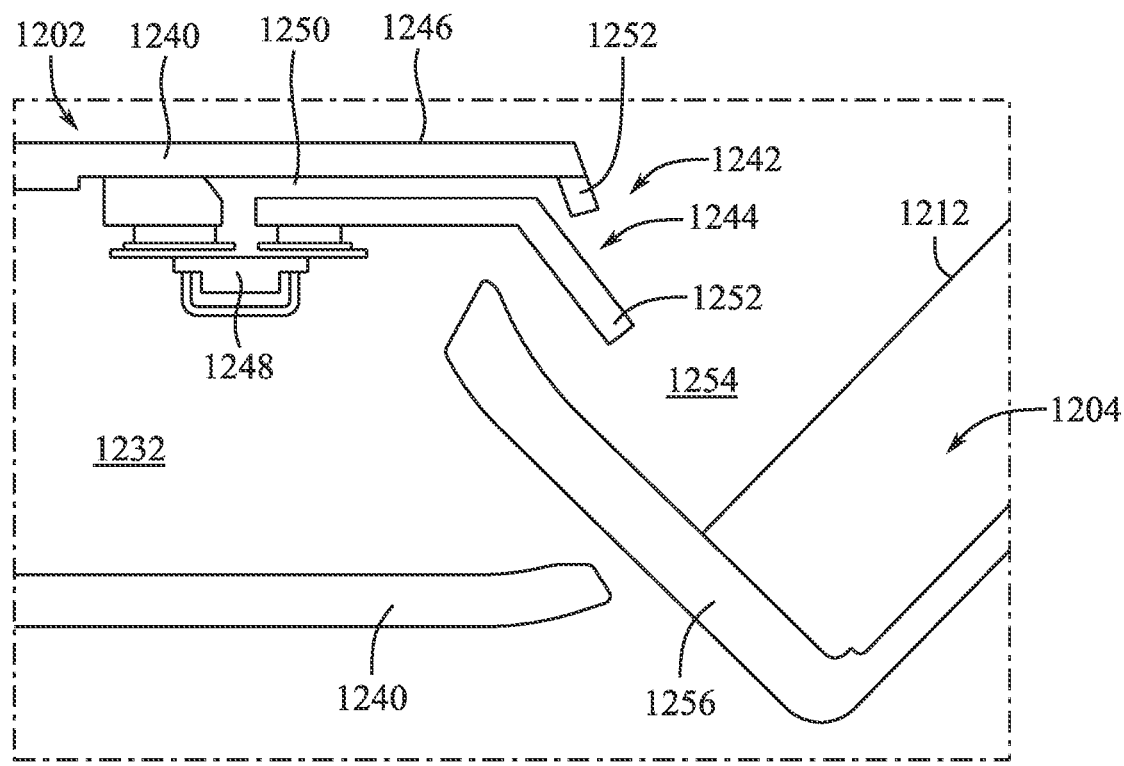
FIG. 12 shows a cross-sectional view of a portion of an exemplary portable electronic device.
Figure 13:
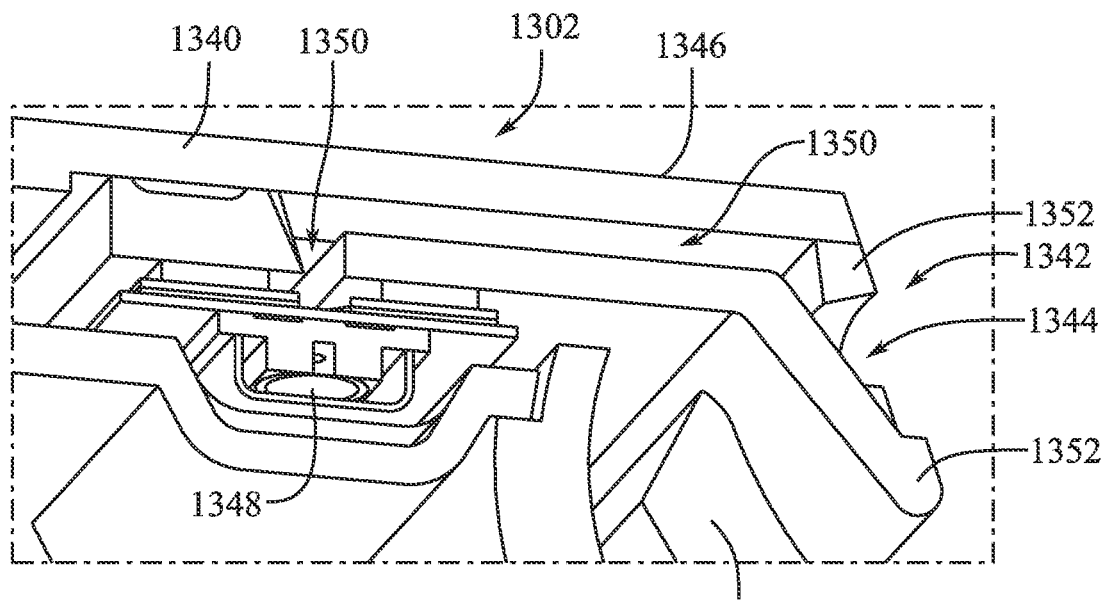
FIG. 13 shows a perspective cross-sectional view of a portion of an exemplary portable electronic device.

FIGS. 12 and 13 show other examples of portable electronic devices with audio ports defined by a rear side. For example, FIG. 12 shows a cross-sectional slice of an example of a device including a lower base portion 1202 and an upper display portion 1204. The lower base portion 1202 can include a housing 1240 having an upper portion 1246. The upper display portion 1204 can include a display screen 1212. The device of FIG. 12 is shown in an open configuration with the upper display portion 1204 rotated away from the lower base portion 1202. In at least one example, the upper display portion 1204 can include a rear portion 1256 of a display housing, which when rotated in the open configuration shown, extends at least partially into the internal volume 1232 defined by the housing 1240 of the lower portion 1202. In at least one example, in the open configuration, the rear portion 1256 of the display housing can extend upward within the internal volume 1232 and at least partially behind the rear wall 1252 of the rear side 1242 of the lower base portion 1202.

In at least one example, the rear wall 1252 of the rear side 1242 of the lower base portion 1202 can extend downward and rearward at an angle so that the rear wall 1252 at least partially occludes the visual path of the user into the internal volume 1232 of the device. In this way, the rear wall 1252 can improve the aesthetic appearance of the device at the rear side 1242 by occluding any components within the internal volume 1232 from view in the open configuration shown in FIG. 12.

In addition, FIG. 12 shows an audio component 1248 disposed in the internal volume 1232 and a channel 1250 defined at least in part by the rear wall 1252 and at least in part by the upper portion 1246 of the housing 1240. The channel 1250 is configured to direct sound between the audio component 1248 and the aperture 1244 defined by the rear wall 1252 of the rear side 1242 of the housing 1240. In this way, the audio component 1248 can be in fluid communication with the external environment 1254 through the aperture 1244. In addition, the channel 1250 directs sound to or from the audio component 1248 from or to, respectively, the upper display portion 1204, including the display screen 1212.

Any of the features, components, and/or parts, including the arrangements and configurations thereof shown in FIG. 12 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 12.

FIG. 13 shows a side cross-sectional view of a device similar to the device shown in FIG. 10. The device in FIG. 13 can include a lower base portion 1302 having a housing 1340 defining an internal volume, a top housing portion 1346, and a rear side 1342. The rear side 1342 can include a rear wall 1352 extending downward from the top housing portion 1346 of the housing 1340. In addition, the device can include an upper portion 1304, such as an upper display portion having a display screen 1312, connected at the rear side 1342. In at least one example, an aperture 1344 can be define by the rear wall 1352 and an audio component 1348 can be disposed in the internal volume of the device. The audio component 1348 can be in fluid communication with an outside environment 1354 through the aperture 1344. A channel 1350 can extend from the audio component 1348 to the aperture 1344.

In at least one example, the rear wall 1352 at least partially defines the channel 1350. Also, as shown in FIG. 13, in at least one example, the top housing portion 1346 at least partially defines the channel 1350. In at least one example, a portion of the rear wall 1352 can extend into the internal volume 1321 to define the channel 1350 between the aperture 1344 and the audio component 1348. In at least one example, one or more other components can define the channel, including one or more other channel walls disposed at or near the audio component 1348.

The device in FIG. 13 is shown in an open configuration including the upper portion 1304 rotated away from the lower portion 1302. The upper portion 1304 can be rotatably connected to the lower base portion 1302 such that the user can rotate the upper portion 1304 relative to the top housing portion 1346 to open and close the device. In such an open configuration shown in FIG. 13, the channel 1350 can directed sound from the audio component 1348, for example a speaker, toward the upper portion 1304. In this way, even though the aperture 1344 is rear-facing, the sound directed by the channel 1350 out the aperture 1344 reflects off the upper portion 1304, for example the display screen 1312, and back toward the user during use.

In another example, the audio component 1348 can include a microphone. Accordingly, with the aperture 1344 defined by the rear side 1342, sound from the user or the external environment 1354 can reflect off the upper portion 1304 and into the channel 1350 through the aperture 1344 from the aperture 1344 to the microphone 1348.

Any of the features, components, and/or parts, including the arrangements and configurations thereof shown in FIG. 13 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 13.

Figure 14:
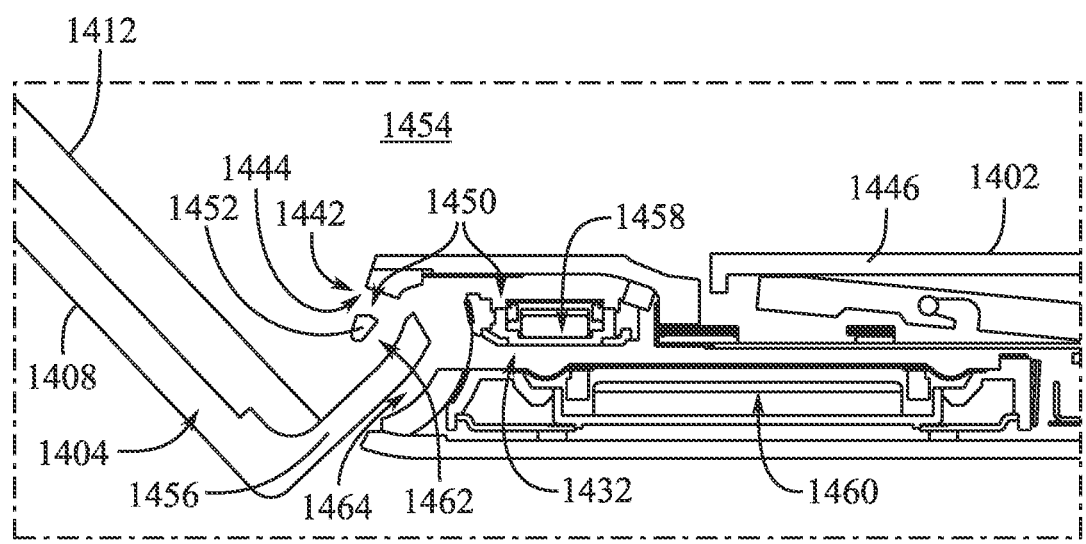
FIG. 14 shows a cross-sectional view of a portion of an exemplary portable electronic device.

FIG. 14 shows cross-sectional view of another example of a portable electronic device, including a base 1402 having a housing 1440 defining an internal volume 1432. The housing 1440 can include an upper portion 1446 and a rear side 1442 having a rear sidewall 1452 extending downward from the upper portion 1446. The device can also include display component 1404 rotatably connected at the rear side 1442. A first aperture 1444 is defined by the rear sidewall 1452. In at least one example, as show in FIGS. 7-9, the rear sidewall 1452 can also define a second aperture (not shown in FIG. 14).

A first speaker 1458 can be disposed in the internal volume 1432 and in fluid communication with an external environment 1454 through the aperture 1444 via a first channel 1450. In addition, a microphone can also be disposed in the internal volume 1432 and be in fluid communication with the external environment 1454 through the second aperture (not shown in FIG. 14 but shown in other figures) via a second channel similar to the first channel 1450 shown in FIG. 14. The second aperture and channel not shown in FIG. 14 can be disposed and defined elsewhere on the rear side 1442 along the major length thereof oriented into and out of the page according to the orientation of FIG. 14.

As noted in other examples described with reference to other figures, a display component 1404 having a housing 1408 and a display screen 1412 can be rotatably connected to the lower base portion 1402 at the rear side 1442. In at least one example, a rear portion 1456 of the housing 1408 of the display component 1404 can extend at least partially into the internal volume 1432 defined by the housing 1440 of the lower base component 1404, as shown in FIG. 14. In at least one example, the channel 1450 can be a first channel at least partially defined by the upper portion 1446 of the housing of the lower base portion 1402 and extend from the first speaker 1358 to the aperture 1444. A second channel 1462 can also be defined at least partially by the rear sidewall 1452 and the rear portion 1456 of the housing 1408 of the display component 1404 in the open configuration shown in FIG. 14. In addition, in at least one example, a third channel 1464 can be at least partially defined by the rear portion 1456 of the housing 1408 of the display component 1404 in the open configuration.

In addition, a second speaker 1460 can be disposed within the internal volume 1432. In the illustrated example of FIG. 14, the first speaker 1458 can be in fluid communication with the external environment 1454 through the aperture 1444 and the first channel 1450 can extend from the first speaker 1458 to the aperture 1444. The first speaker 1458 can also be in fluid communication with the external environment 1454 through the second channel 1462. The sound traveling through the first and second channels 1450 and 1464 can reflect of the display component 1404, for example off the display screen 1412, to direct sound from the first speaker 1458 directly to the user. In addition, the first speaker 1458 can also be in fluid communication with the external environment 1454 through the third channel 1462.

Likewise, the second speaker 1460 can be in fluid communication with the external environment 1454 through the aperture 1444. The second speaker 1460 can also be in fluid communication with the external environment 1454 through the second channel 1462. In addition, the first speaker 1458 can also be in fluid communication with the external environment 1454 through the third channel 1462. In at least one example, the first speaker can be smaller than the second speaker 1460 and configured to generally output sound waves of higher frequencies than those output by the second, larger speaker 1460. In at least one example, the first speaker 1458 can be referred to as a tweeter. In at least one example, the second speaker 1460 can be referred to as a woofer. In any case, the higher frequency sounds produced by the first speaker 1458 can predominantly exit the internal volume 1432 through the first and second channels 1450, 1462 such that the sound waves reflect off the display screen 1412 toward the user.

The lower frequencies output by the second speaker 1460 can also exit out the first and second channels 1450, 1462 but also, in some examples, predominantly exit out the third channel 1464. The lower frequency sounds output by the second, larger speaker 1460 can be less prone decreased sound quality based on the direction of the third channel 1464 and may pass through the device from under the device or around the device to the user in addition to sound from the second speaker 1460 travelling through the first and second channels 1450, 1462 and reflecting off the display screen 1412 toward the user.

Any of the features or aspects of the devices and components discussed herein can be combined or included in any varied combination. For example, the design and shape of the components or devices is not limited in any way and can be formed by any number of processes, including those discussed herein. As used herein, the terms exterior, outer, interior, and inner are used for reference purposes only. An exterior or outer portion of a component can form a portion of an exterior surface of the component, but may not necessarily form the entire exterior of outer surface thereof. Similarly, the interior or inner portion of a component can form or define an interior or inner portion of the component, but can also form or define a portion of an exterior or outer surface of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "including."

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A retention assembly of a display film, comprising:
   an aperture defined by the display film, the display film encircling the aperture;
   a post extending toward the aperture; and
   a bracket having a first portion adhered to the display film and a second portion abutting the post.

2. The display film retention assembly of claim 1, wherein the second portion is disposed at an angle relative to the first portion.

3. The display film retention assembly of claim 1, wherein the second portion extends through the aperture.

4. The display film retention assembly of claim 3, wherein the post extends through the aperture.

5. The display film retention assembly of claim 1, wherein the first portion is adhered to the display film with a pressure sensitive adhesive.

6. The display film retention assembly of claim 1, wherein:
   the post extends from a housing component; and
   the display film is disposed between the first portion of the bracket and the housing component.

7. The display film retention assembly of claim 6, wherein the second portion of the bracket extends through the aperture and terminates between the display film and the housing component.

8. The display film retention assembly of claim 6, wherein the first portion of the bracket is disposed between the housing component and the display film.

9. A display assembly, comprising:
   a housing defining an internal volume;
   a film layer disposed in the internal volume, the film layer defining an aperture;
   a post extending from the housing and through the film layer by way of the aperture; and
   a bracket including a first portion adhered to the display film and a second portion disposed at an angle relative to the first portion, the second portion extending through the film layer by way of the aperture.

10. The display assembly of claim 9, wherein the film layer is disposed between the first portion of the bracket and the housing.

11. The display assembly of claim 9, wherein the second portion of the bracket is disposed between the film layer and the housing.

12. The display assembly of claim 9, wherein the second portion of the bracket abuts the post.

13. The display assembly of claim 9, wherein the angle is between about 80-degrees and about 100-degrees.

14. The display assembly of claim 9, wherein the angle is about 90-degrees.

15. The display assembly of claim 9, further comprising a foam biasing member disposed against the first portion of the bracket.

16. An electronic device, comprising:
   a display component;
   a rear housing;
   a display film disposed between the display component and the rear housing, the display film defining an aperture, the display film comprising a first surface facing towards the rear housing and a second surface facing away from the rear housing;
   a post extending from the rear housing toward the aperture; and
   a bracket including a first portion adhered to the second surface of the display film, and a second portion abutting the post.

17. The electronic device of claim 16, wherein the post is aligned with the aperture.

18. The electronic device of claim 17, wherein the post extends through the aperture.

19. The electronic device of claim 16, wherein the second portion extends through the aperture.

20. The electronic device of claim 16, further comprising a biasing member disposed between the first portion and the display component.

* * * * *